United States Patent
Loimuneva et al.

(10) Patent No.: US 8,904,243 B2
(45) Date of Patent: Dec. 2, 2014

(54) EVENT MANAGEMENT SYSTEMS AND METHODS

(75) Inventors: Tero Loimuneva, Hyvinkaa (FI); Teemu Tamminen, Kojonpera (FI)

(73) Assignee: SAP SE, Walldorf (DE)

( * ) Notice: Subject to any disclaimer, the term of this patent is extended or adjusted under 35 U.S.C. 154(b) by 230 days.

(21) Appl. No.: 13/537,488

(22) Filed: Jun. 29, 2012

(65) Prior Publication Data

US 2014/0006881 A1    Jan. 2, 2014

(51) Int. Cl.
*G06F 11/00* (2006.01)

(52) U.S. Cl.
USPC .................. 714/48; 714/38.1; 714/38.11

(58) Field of Classification Search
USPC ....................... 714/38.1, 38.11, 48
See application file for complete search history.

(56) References Cited

U.S. PATENT DOCUMENTS

| | | | |
|---|---|---|---|
| 6,226,761 B1 * | 5/2001 | Berstis | 714/37 |
| 6,615,377 B1 * | 9/2003 | da Cruz et al. | 714/724 |
| 6,948,092 B2 * | 9/2005 | Kondo et al. | 714/12 |
| 7,451,064 B2 * | 11/2008 | Hodge et al. | 702/187 |
| 7,478,279 B2 * | 1/2009 | Shankar et al. | 714/20 |
| 7,493,598 B1 * | 2/2009 | Craggs | 717/124 |
| 7,765,432 B2 * | 7/2010 | Caldwell et al. | 714/38.1 |
| 7,849,364 B2 * | 12/2010 | Callender | 714/38.1 |
| 8,510,603 B2 * | 8/2013 | Bendig | 714/38.1 |
| 2002/0143784 A1 * | 10/2002 | Sluiman | 707/100 |
| 2005/0010909 A1 * | 1/2005 | Lebee et al. | 717/124 |
| 2006/0075286 A1 * | 4/2006 | Hodge et al. | 714/5 |
| 2006/0089767 A1 * | 4/2006 | Sowa | 701/29 |
| 2006/0294423 A1 * | 12/2006 | Shankar et al. | 714/20 |
| 2008/0195838 A1 * | 8/2008 | Cooper | 711/206 |
| 2009/0063904 A1 * | 3/2009 | Abrashkevich et al. | 714/38 |
| 2009/0193298 A1 * | 7/2009 | Mukherjee | 714/38 |
| 2010/0161141 A1 * | 6/2010 | Herre et al. | 700/283 |
| 2010/0306599 A1 * | 12/2010 | Cota-Robles et al. | 714/48 |
| 2013/0198575 A1 * | 8/2013 | Etaati | 714/47.1 |

* cited by examiner

*Primary Examiner* — Joshua P Lottich
(74) *Attorney, Agent, or Firm* — Schwegman Lundberg Woessner, P.A.

(57) ABSTRACT

Example event management systems and methods are described. In one implementation, a method monitors an application implemented using one or more processors. The method identifies activity data associated with operation of the application. The activity data is stored in a cyclic buffer. Upon detection of an error event associated with the operation of the application, the activity data in the cyclic buffer is written to a log file.

20 Claims, 7 Drawing Sheets

EVENT MANAGEMENT SYSTEMS AND METHODS

FIELD

The present disclosure relates generally to managing data and, more specifically, managing events associated with the operation of computer applications.

BACKGROUND

Applications executed by a processor or other computing device may occasionally experience errors or unintended operations. Troubleshooting these errors can be tedious and time-consuming. To identify the cause of the error, software developers or other personnel attempt to identify various information, such as the type of error, when the error occurred, and other information regarding the status of the application at the time of the error. This information is useful in determining how to modify the application to reduce the likelihood of similar future errors.

Existing systems may record data regarding an application's operation to a log file that can be analyzed after an error occurs to help determine the status of the application at the time of the error. These existing systems often record significant amounts of data to a persistent storage device. In many cases, this information is never analyzed because an error did not occur near the time the data was recorded. This continual storing of data to a log file may require significant use of both processor resources and storage resources.

BRIEF DESCRIPTION OF THE DRAWINGS

The present disclosure is illustrated by way of example and not limitation in the figures of the accompanying drawings, in which like references indicate similar elements.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

At least some of the embodiments described herein provide various techniques for managing events associated with the operation of computer applications. In particular examples, activity data related to a computer application is stored in a buffer and written to a log file upon detection of an error or other triggering event. This application activity data is useful in troubleshooting the error and determining the cause of the error being investigated. Typically the activity data is not accessed unless an error occurs. Thus, storing significant amounts of application activity data to a log file on a continuous basis may require large storage devices. The systems and methods described herein store recent application activity data in a buffer. This application activity data is overwritten on a regular basis, thereby limiting the amount of buffer storage space required. When an error occurs, the contents of the buffer are written to a log file on a persistent storage device. Since the application activity data in the buffer is only written to the log file when an error occurs, the size of the log file is significantly reduced as compared to storing all application activity data. Therefore, the described systems and methods provide full detail of application activity data preceding detection of an error, but avoid the cost of persistently storing all application activity data.

Figure 1:
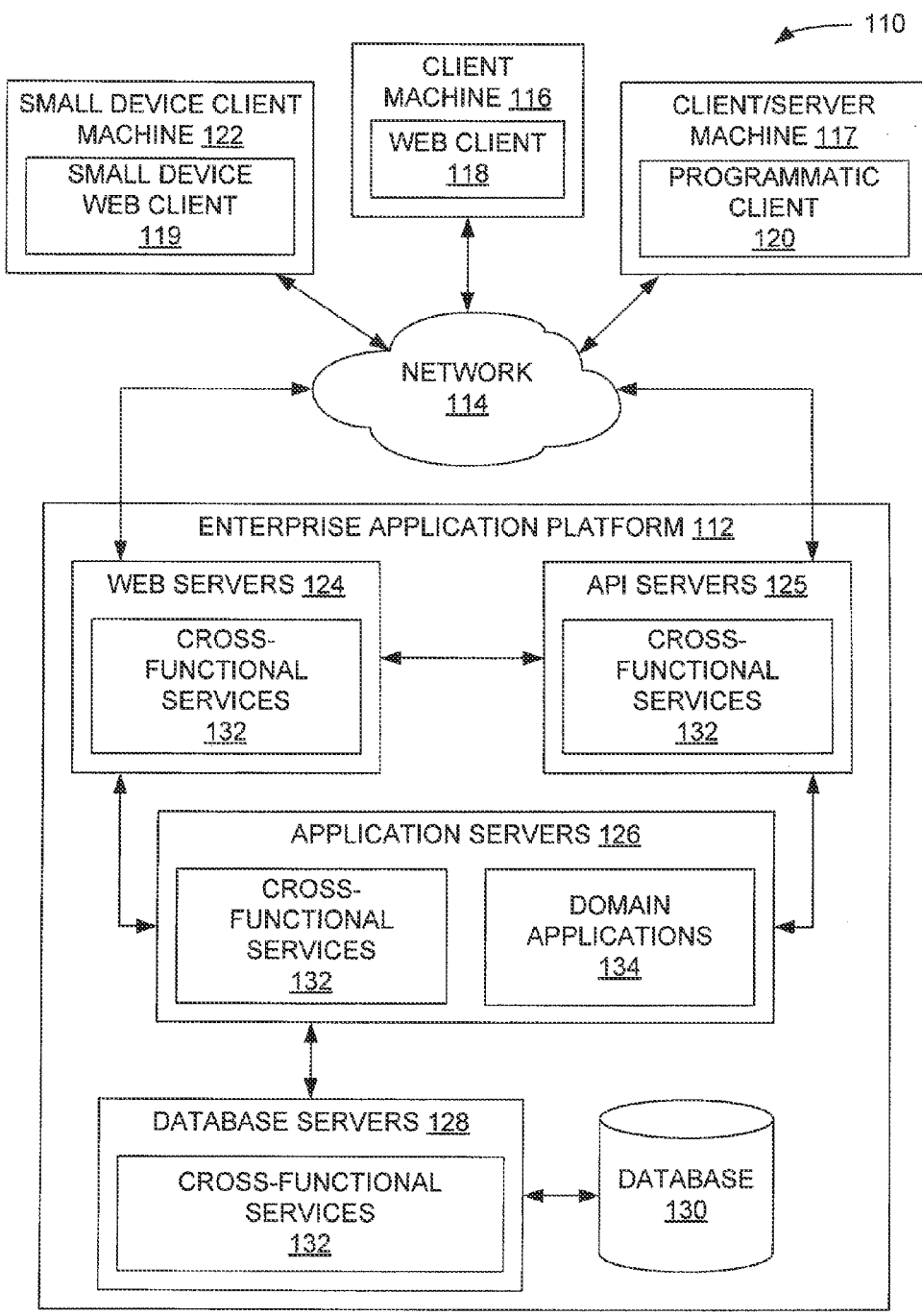
FIG. 1 is a block diagram of an example system having a client-server architecture for an enterprise application platform capable of employing the systems and methods described herein.

FIG. 1 is a network diagram depicting an example system 110, according to one exemplary embodiment, having a client-server architecture configured to perform the various methods described herein. A platform (e.g., machines and software), in the exemplary form of an enterprise application platform 112, provides server-side functionality via a network 114 (e.g., the Internet) to one or more clients. FIG. 1 illustrates, for example, a client machine 116 with a web client 118 (e.g., a browser, such as the Internet Explorer browser developed by Microsoft Corporation of Redmond, Wash.), a small device client machine 122 with a small device web client 119 (e.g., a browser without a script engine) and a client/server machine 117 with a programmatic client 120.

Turning specifically to the enterprise application platform 112, web servers 124, and Application Program Interface (API) servers 125 are coupled to, and provide web and programmatic interfaces to, application servers 126. The application servers 126 are, in turn, shown to be coupled to one or more database servers 128 that may facilitate access to one or more databases 130. The web servers 124, Application Program Interface (API) servers 125, application servers 126, and database servers 128 may host cross-functional services 132. The application servers 126 may further host domain applications 134.

The cross-functional services 132 may provide user services and processes that utilize the enterprise application platform 112. For example, the cross-functional services 132 may provide portal services (e.g., web services), database services, and connectivity to the domain applications 134 for users that operate the client Machine 116, the client/server machine 117, and the small device client machine 122. In addition, the cross-functional services 132 may provide an environment for delivering enhancements to existing applications and for integrating third party and legacy applications with existing cross-functional services 132 and domain applications 134. Further, while the system 110 shown in FIG. 1 employs a client-server architecture, the present disclosure is of course not limited to such an architecture, and could equally well find application in a distributed, or peer-to-peer, architecture system.

Figure 2:
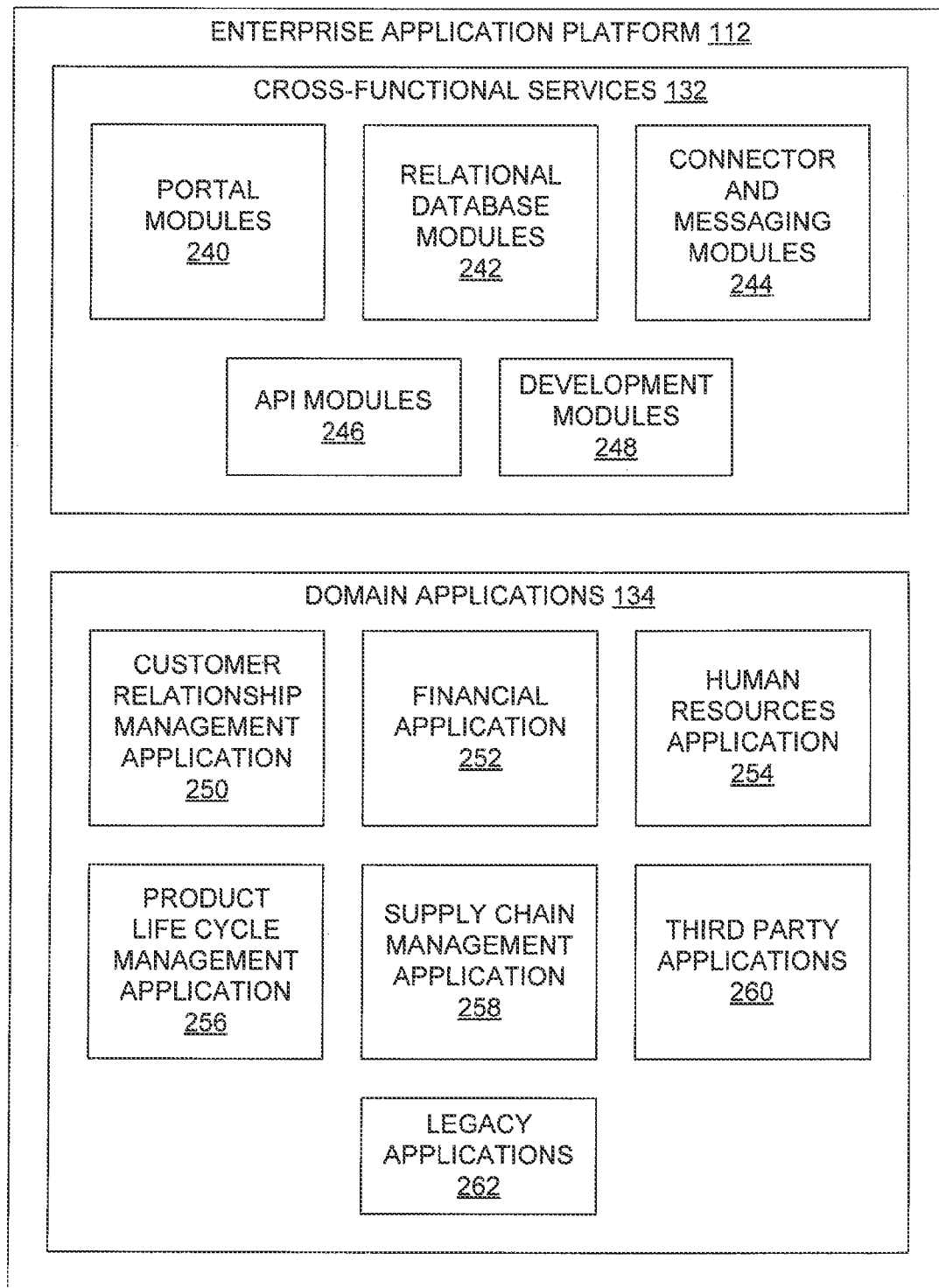
FIG. 2 is a block diagram of example applications and modules employable in the enterprise application platform of FIG. 1.

FIG. 2 is a block diagram illustrating example enterprise applications and services, such as those described herein, as embodied in the enterprise application platform 112, according to an exemplary embodiment. The enterprise application platform 112 includes cross-functional services 132 and domain applications 134. The cross-functional services 132 include portal modules 240, relational database modules 242, connector and messaging modules 244, Application Program Interface (API) modules 246, and development modules 248.

The portal modules 240 may enable a single point of access to other cross-functional services 132 and domain applications 134 for the client Machine 116, the small device client machine 122, and the client/server machine 117 of FIG. 1. The portal modules 240 may be utilized to process, author, and maintain web pages that present content (e.g., user interface elements and navigational controls) to the user. In addition, the portal modules 240 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 240 may include, in one implementation, a generation module, a communication module, a receiving module, and a regenerating module. In addition, the portal modules 240 may comply with web services standards and/or utilize a variety of Internet technologies, including, but not limited to, Java, J2EE, SAP's Advanced Business Application Programming Language (ABAP) and Web Dynpro, XML, JCA, JAAS, X.509, LDAP, WSDL, WSRR, SOAP, LODI, and Microsoft .NET.

The relational database modules 242 may provide support services for access to the database 130 (FIG. 1) that includes a user interface library. The relational database modules 242 may provide support for object relational mapping, database independence, and distributed computing. The relational database modules 242 may be utilized to add, delete, update, and manage database elements. In addition, the relational database modules 242 may comply with database standards and/or utilize a variety of database technologies including, but not limited to, SQL, SQLDBC, Oracle, MySQL, Unicode, and JDBC.

The connector and messaging modules 244 may enable communication across different types of messaging systems that are utilized by the cross-functional services 132 and the domain applications 134 by providing a common messaging application processing interface. The connector and messaging modules 244 may enable asynchronous communication on the enterprise application platform 112.

The Application Program Interface (API) modules 246 may enable the development of service-based applications by exposing an interface to existing and new applications as services. Repositories may be included in the platform as a central place to find available services when building applications.

The development modules 248 may provide a development environment for the addition, integration, updating, and extension of software components on the enterprise application platform 112 without impacting existing cross-functional services 132 and domain applications 134.

Turning to the domain applications 134, the customer relationship management applications 250 may enable access to and facilitate collecting and storing of relevant personalized information from multiple data sources and business processes. Enterprise personnel that are tasked with developing a buyer into a long-term customer may utilize the customer relationship management applications 250 to provide assistance to the buyer throughout a customer engagement cycle.

Enterprise personnel may utilize the financial applications 252 and business processes to track and control financial transactions within the enterprise application platform 112. The financial applications 252 may facilitate the execution of operational, analytical, and collaborative tasks that are associated with financial management. Specifically, the financial applications 252 may enable the performance of tasks related to financial accountability, planning, forecasting, and managing the cost of finance.

The human resources applications 254 may be utilized by enterprise personal and business processes to manage, deploy, and track enterprise personnel. Specifically, the human resources applications 254 may enable the analysis of human resource issues and facilitate human resource decisions based on real-time information.

The product life cycle management applications 256 may enable the management of a product throughout the life cycle of the product. For example, the product life cycle management applications 256 may enable collaborative engineering, custom product development, project management, asset management, and quality management among business partners.

The supply chain management applications 258 may enable monitoring of performances that are observed in supply chains. The supply chain management applications 258 may facilitate adherence to production plans and on-time delivery of products and services.

The third-party applications 260, as well as legacy applications 262, may be integrated with domain applications 134 and utilize cross-functional services 132 on the enterprise application platform 112.

Figure 3:
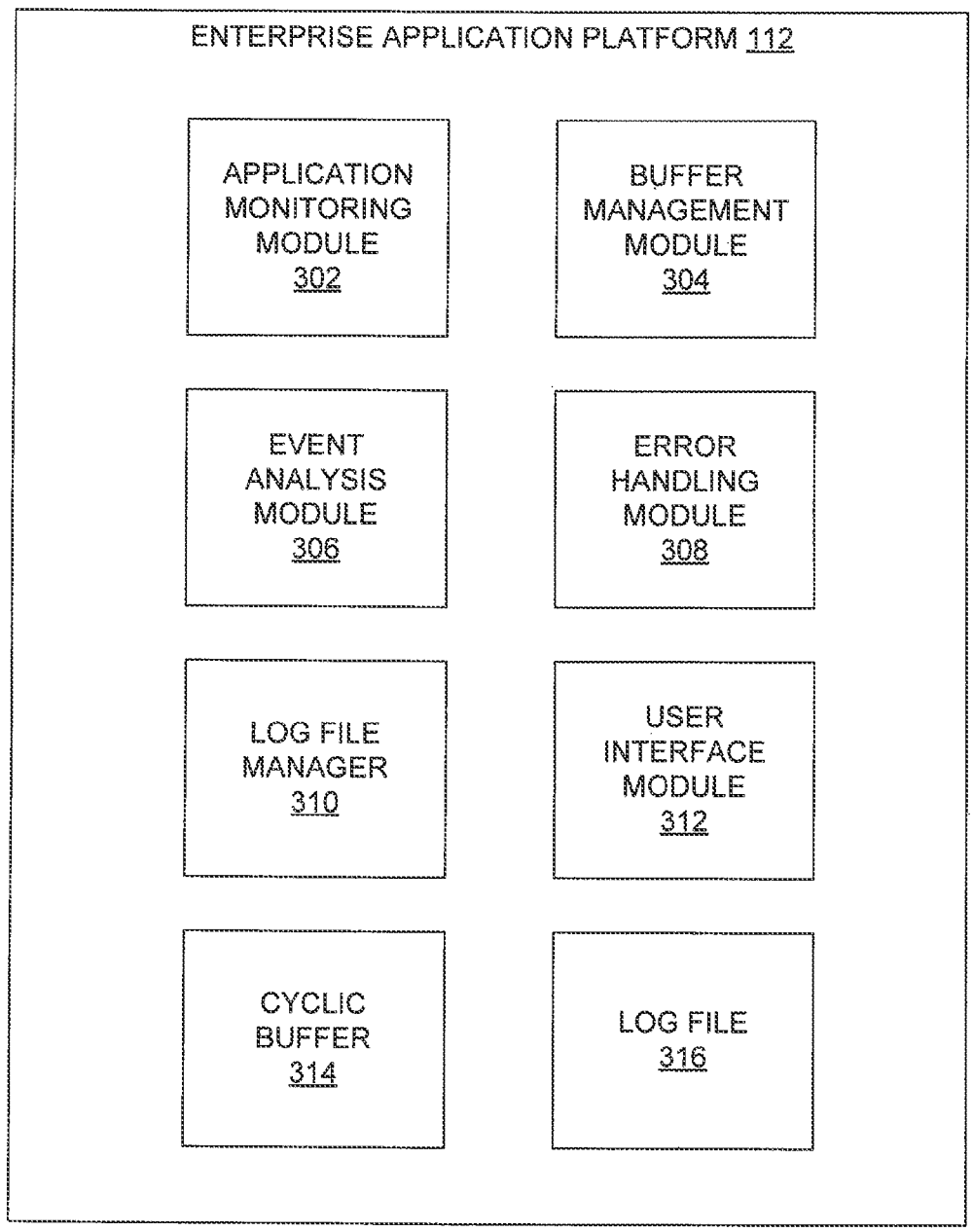
FIG. 3 is a block diagram of example applications and modules utilized in the enterprise application platform of FIG. 1 for managing events.

FIG. 3 is a block diagram of example applications and modules utilized in the enterprise application platform of FIG. 1 for managing events. In some embodiments, the applications and modules of FIG. 3 manage events associated with any of the applications and services discussed herein with respect to FIGS. 1 and 2. An application monitoring module 302 monitors the operation of one or more applications as discussed herein. The application monitoring module 302 may identify any type of application activity, application data, application status, and so forth. For example, the application monitoring module 302 may identify particular activities, actions, events or operations performed by an application. Example activity data monitored by application monitoring module 302 includes system settings, operating status, parameter values, pointer values, application state, and any other data associated with an application or system in which an application is operating. Example activities include user commands, system commands, input/output operations, user input to an application, application tasks being performed, system tasks being performed, and the like.

A buffer management module 304 performs various data storage and data retrieval operations related to one or more buffers, such as a cyclic buffer 314 discussed herein. The buffer management module 304 also maintains various status information associated with the buffers. In some embodiments, the buffer management module 304 manages one or more pointers (or similar identifiers) that indicate, for example, a valid data starting point, a valid data ending point, and the like. Additional details regarding the cyclic buffer 314 are discussed below.

An event analysis module 306 performs various analysis operations on event data and other information associated with an application being monitored by the application monitoring module 302. For example, the event analysis module 306 may identify various types of events, such as error events, that indicate an actual or potential problem with the application being monitored. In some embodiments, the event analysis module 306 identifies events in addition to error events, such as conditions within an application, user actions, operating environment status, and the like. As part of the analysis, the event analysis module 306 may determine the severity of the event and determine whether specific actions are required to respond to the event. For example, if the event indicates an actual or potential malfunction of the application, the event analysis module 306 may communicate information regarding the event to an error handling module 308 or other system. In some embodiments, the application being monitored may identify a particular event as an error event. Additionally, for each event, the application being monitored may identify an event type, such as a debug, trace, informational, warning, error, and the like. In other embodiments, event analysis includes identifying multiple frequent executions of a particular code sequence in an application, which may indicate an infinite loop or other malfunction of the application.

The error handling module 308 performs various Operations in response to detection of one or more errors in the application. For example, the error handling module 308 may notify other systems or processes about the error, implement operations to resolve the error, save information associated with the state of the application, write the contents of cyclic buffer 314 to a log file 316, and the like. In some embodiments, error handling module 308 is not limited to handling errors. In these embodiments, error handling module 308 performs operations in response to detection of various application activities, application states, and the like.

A log file manager 310 performs various functions related to one or more log files 316. For example, the log file manager 310 may manage the writing of data to the log file 316, the reading of data from the log file 316, and maintain a record of data stored in the log file 316. The log file 316 stores information related to application events (such as error events), application data, application activities and the like. The information stored in the log file 316 is useful in troubleshooting various events and activities that occur during operation of the application. The log file 316 may also be referred to as a "trace log" or a "trace file". In some embodiments, the log file 316 is stored in a persistent storage device, such as a hard disk drive or other non-volatile memory device.

A user interface module 312 allows one or more users to interact with the various applications and modules shown in FIG. 3. For example, users may define event analysis parameters, buffer management procedures, error handling procedures, and the like through the user interface module 312. The cyclic buffer 314 stores, for example, information related to various application activity, application data, application status, and events. In some embodiments, the cyclic buffer 314 is implemented in a volatile memory device, such as a Random Access Memory (RAM). The cyclic buffer 314 may also be referred to as a "trace log buffer" or "trace log history buffer." Additional details regarding the cyclic buffer 314 are discussed herein.

FIGS. 4A-4D illustrate the contents of an example cyclic buffer 400 at different time periods. As discussed herein, the cyclic buffer 400 stores various data associated with the operation of one or more applications, regardless of whether an error or other problem is detected with the application. If an error or other triggering event is detected during operation of the application, the current contents of the cyclic buffer 400 are written to a log file on a persistent storage device. In the examples of FIGS. 4A-4D, the cyclic buffer 400 contains eight elements (represented as a sequence of eight square boxes). Eight elements are shown for purposes of explanation and illustration. Actual embodiments of the cyclic buffer 400 may contain any number of elements. Additionally, the elements in the cyclic buffer 400 may be configured to store any amount of data.

When determining the size (e.g., storage capacity) of the cyclic buffer 400, a user or developer may consider various factors, such as the amount of memory available for the buffer (e.g., available high-speed RAM), the structure of the application code and the location of event logging code within the application code, the amount of activity associated with the operation of the application, the number of users accessing the application, the number of parallel executing threads logging events in the application, and the like. In some embodiments, the size of the cyclic buffer 400 is determined, at least in part, by amount of desired data that precedes the occurrence of an error event or other activity. For example, when troubleshooting an error event, if the activities that lead to a typical error occur within three or four minutes of the event, then a buffer size that holds approximately five minutes of application activity data is likely to be sufficient. This allows the cyclic buffer 400 to store detailed activity data during the most relevant time related to a particular error event. In some embodiments, the size of the cyclic buffer 400 may change based on application changes, analysis of subsequent activity data associated with error events, and the like.

In other implementations, the size of the cyclic buffer 400 is determined by the minimum number of log lines needed to sufficiently determine what the application was doing prior to the triggering event. Generally, the cyclic buffer 400 needs to be larger if more historical data is needed to determine the cause of a particular error. For example, the cause of some errors can be determined within a few lines of log data while determining the cause of other errors may require more than 1000 lines of log data. In some embodiments, the initial size of the cyclic buffer 400 is large, but is reduced in size, if appropriate, based on analysis of actual errors and the amount of log data needed to determine the cause of those errors. The size of the cyclic buffer 400 can be adjusted "on the fly" without restarting or otherwise interfering with the operation of the application being monitored.

The cyclic buffer 400 is also referred to as a "ring buffer" or a "circular buffer." Generally, the cyclic buffer 400 has a fixed size (eight elements in the examples of FIGS. 4A-4D). When the cyclic butler 400 is full, the oldest existing data is overwritten by new data. In the description of FIGS. 4A-4D, data is written to the cyclic buffer 400 from left-to-right, as discussed below. In some embodiments, the cyclic buffer 400 may be considered as a First-In, First-Out (FIFO) buffer.

Figure 4A:
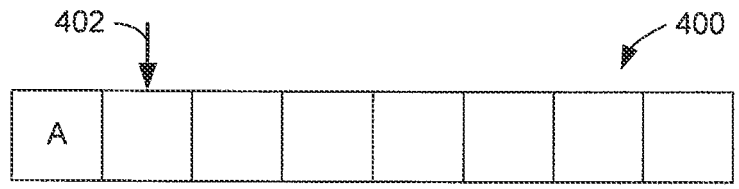
FIGS. 4A-4D illustrate the contents of an example cyclic buffer at different time periods.
Figure 4B:
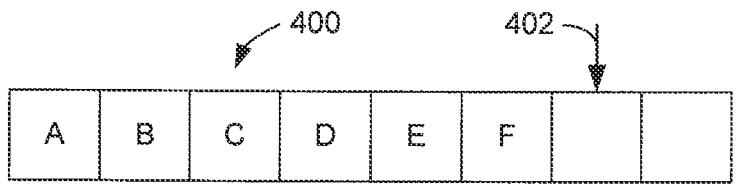
Figure 4C:
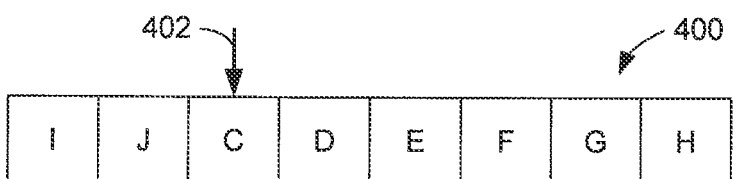
Figure 4D:
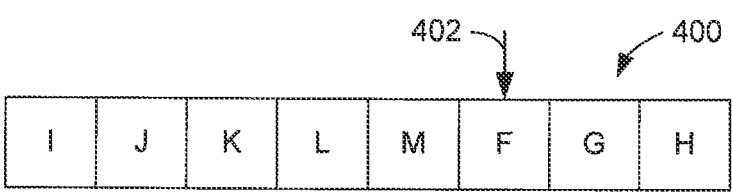

FIG. 4A illustrates the cyclic buffer 400 after data "A" is written to the first element of the buffer. A pointer 402 indicates the position (i.e., element) at which the next data will be written into the cyclic buffer 400. FIG. 4B illustrates the cyclic buffer 400 after data "B", "C", "D", "E", and "F" are written: to the buffer. In this situation; the position of the pointer 402 is changed to indicate the next element in the buffer (i.e.; the element following the "F" data). FIG. 4C illustrates the cyclic buffer 400 after data "G", "H", "I", and "J" are written to the buffer. In this example, data "G" and "H" fill the last two elements of the buffer and data "I" and are written into the two left-most elements, which overwrites the previous "A" and "B" data, respectively. Additionally, the position of the pointer 402 is changed to indicate the next element in the buffer (i.e., the element currently containing the "C" data). FIG. 4D illustrates the cyclic buffer 400 after data "K", "L", and "M" are written to the buffer. In this example, the previous "C", "D", and "E" data are overwritten by the new "K", "L", and "M" data, respectively. The position of the pointer 402 is changed to indicate the next element in the buffer (i.e., the element currently containing the "F" data). This process of writing data to the cyclic buffer 400 continues as new application activity data is received and stored in the buffer. Thus, at any time, the latest application activity data is stored in the cyclic buffer 400. Additionally, since the pointer 402 identifies the oldest data in the cyclic buffer 400, the position of the pointer 402 indicates the chronological order in which the data was written into the buffer.

Figure 5:
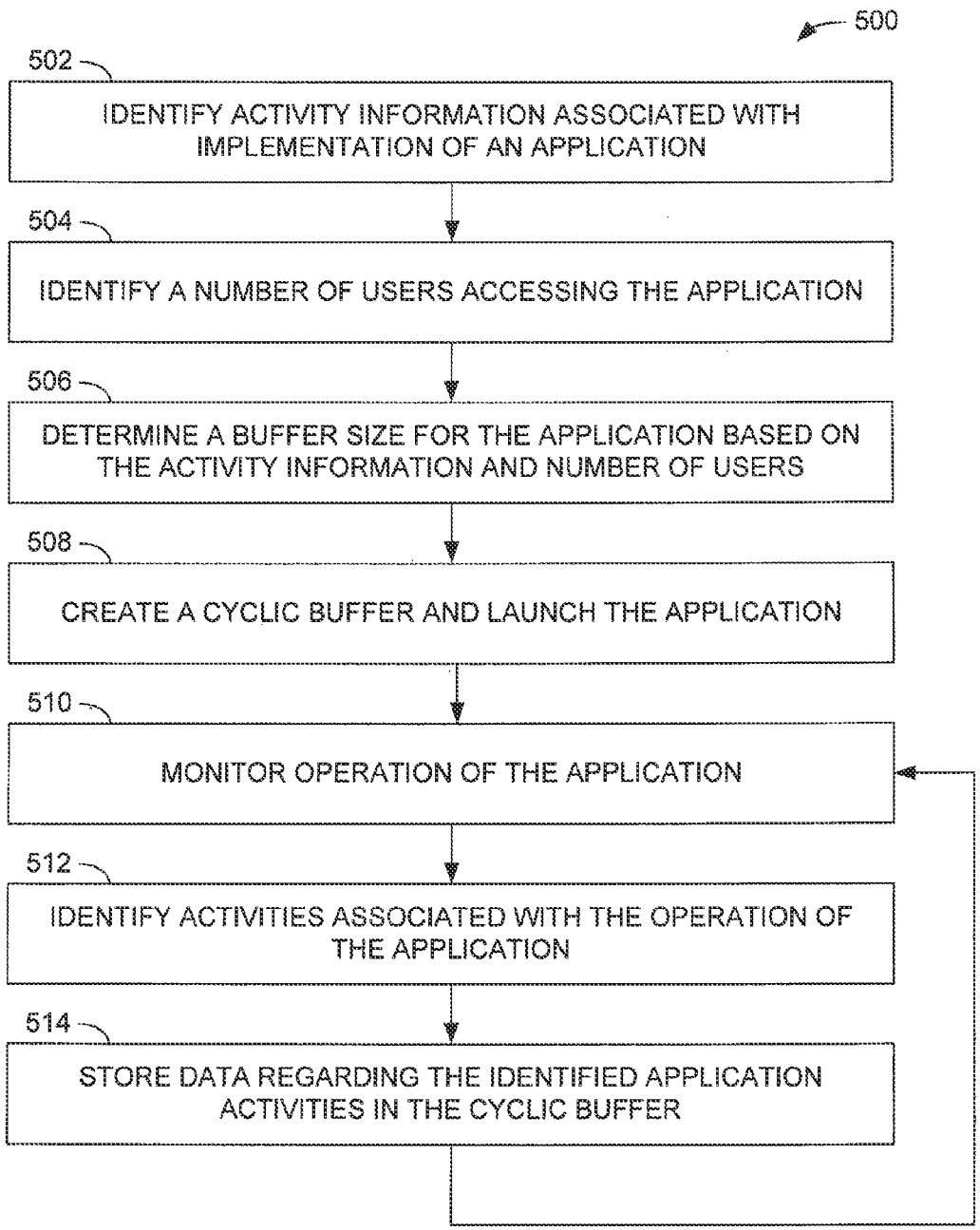
FIG. 5 is a flow diagram of an example method of monitoring and storing data related to activities associated with operation of an application.

FIG. 5 is a flow diagram of an example method 500 of monitoring and storing data related to activities associated with operation of an application. In some embodiments, method 500 is implemented using at least a portion of the applications and modules shown in FIG. 3. Initially, the method 500 identifies activity information associated with implementation of an application at 502. This activity information includes, for example, functions performed by the application, data received by the application, data created or transmitted by the application, user inputs, application operating status, the line of code being executed at the time of the event, and the like. The method 500 continues by identifying a number of users accessing the application at 504. Based on the identified activity information and the number of users accessing the application, the method 500 determines a buffer size for the application at 506. As discussed above, the buffer size may also be determined, at least in part, based on other factors such as a temporal amount of data to store in the buffer, available memory resources for the buffer, and the like. Although FIG. 5 mentions determining a buffer size for a particular application, alternate implementations may utilize a single buffer for multiple applications using a similar procedure.

After determining a buffer size for the application, the method 500 creates a cyclic buffer having the determined buffer size and launches the application associated with the cyclic buffer at 508. The method then monitors operation of the application at 510 and identifies activities associated with the operation of the application at 512. Data associated with the identified application activities are stored in the cyclic buffer at 514. The method continues monitoring operation of the application, identifying activities associated with the application, and storing data related to those activities in the cyclic buffer. As discussed above, the oldest data in the cyclic buffer is overwritten by new data in a cyclical manner. Additionally, a pointer position is updated each time new data is written to the cyclic buffer. As discussed above, the size of the cyclic buffer can be adjusted at a future time "on the fly" without restarting or otherwise interfering with the running application.

Figure 6:
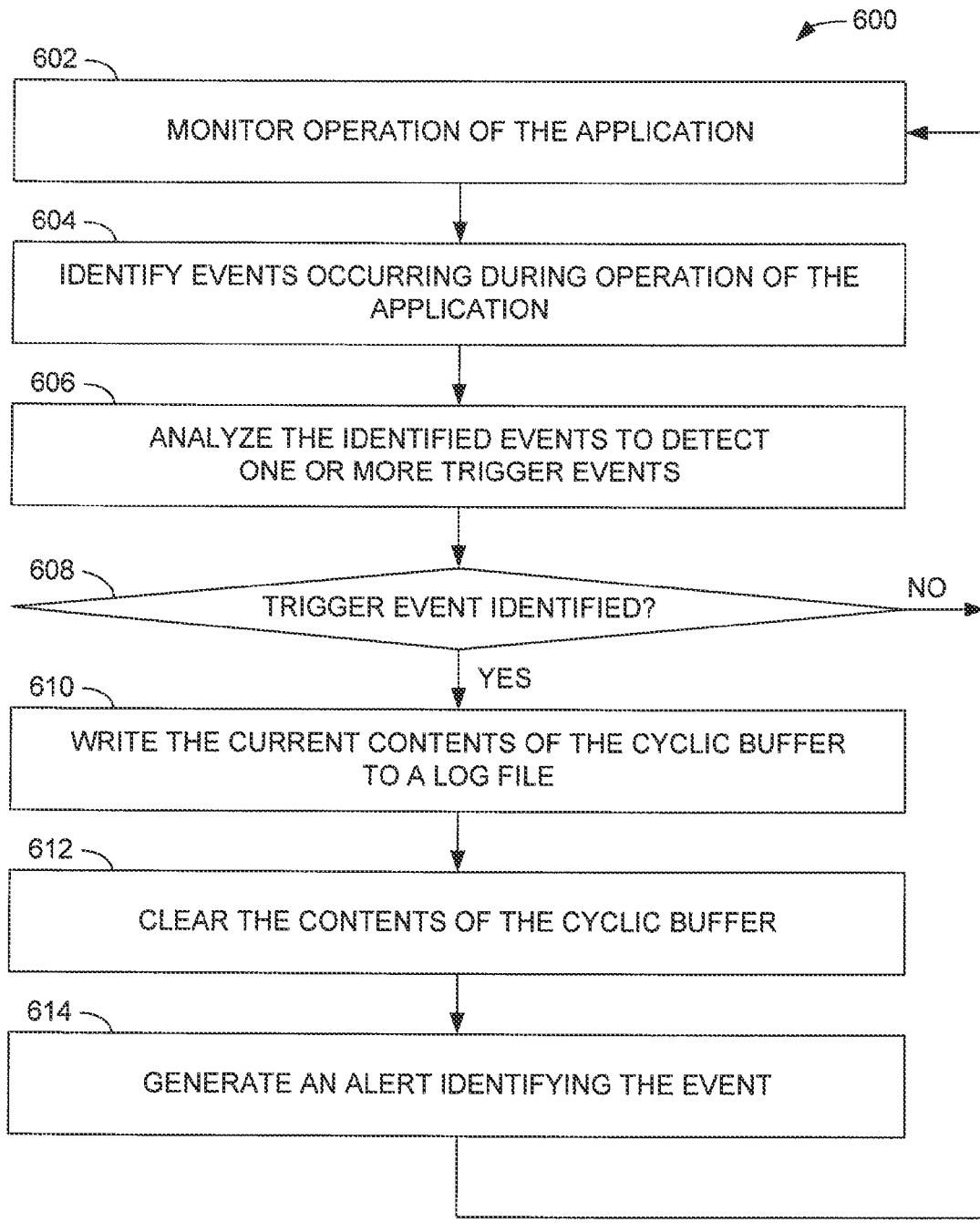
FIG. 6 is a flow diagram of an example method of providing application activity data to a log file upon detection of an event.

FIG. 6 is a flow diagram of an example method 600 of providing application activity data to a log file upon detection of an event. In some embodiments, method 600 is implemented using at least a portion of the applications and Modules shown in FIG. 3. Initially, method 600 monitors operation of the application at 602, as discussed herein. Events are identified that occur during operation of the application at 604. The identified events are analyzed to detect one or more trigger events at 606. A trigger event is an error event or other event that needs particular attention. In some embodiments, the types of events that "trigger" the particular attention are determined by a user, such as an application developer or administrator of a system that implements the application. If a trigger event is not identified at 608, the method 600 continues monitoring operation of the application, identifying events, and analyzing the identified events.

If a trigger event is detected at 608, the current contents of the cyclic buffer are written to a log file at 610. In some embodiments; the log file is stored on a persistent storage device and may contain data associated with multiple trigger events. A user, such as a software developer, may access the data in the log file to analyze and troubleshoot the source of the trigger event. After the cyclic buffer contents are written to the log file, the contents of the cyclic buffer are cleared at 612 to prevent duplicate log file entries resulting from a subsequent writing of the same data if another trigger event occurs before all data in the cyclic buffer is overwritten. Finally, method 600 generates an alert at 614 identifying the event that caused the writing of the cyclic buffer to the log file. This alert may be sent to one or more users, systems, applications or procedures, based on, for example, various event alert parameters.

In some embodiments, the cyclic buffer discussed herein is associated with multiple applications or multiple instances of an application. These embodiments may provide a broader view of events in an entire system instead of just a single application (or a single instance of an application). In this embodiment, identification of an event in one application may cause data associated with multiple applications to be written to the log file. For example, an error event occurring in one application will trigger the writing of data to the log file that is related to other applications running in the system. This additional data allows for a more detailed analysis of the entire system, such as where one application is at least partially responsible for an error event that occurs in a different application.

Figure 7:
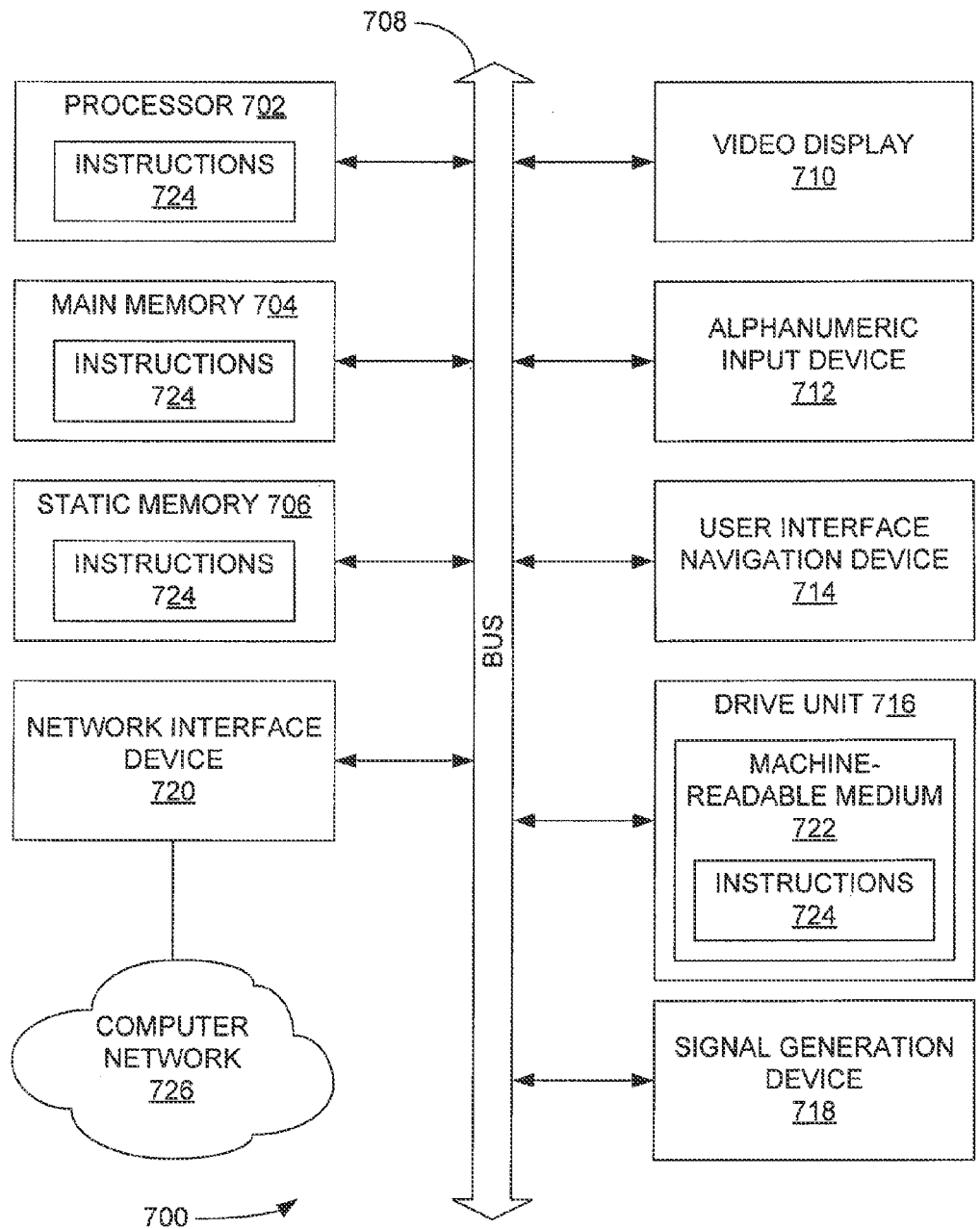
FIG. 7 depicts a block diagram of a machine in the example form of a processing system within which may be executed a set of instructions for causing the machine to perform any one or more of the methodologies discussed herein.

FIG. 7 depicts a block, diagram of a machine in the example form of a processing system 700 within which may be executed a set of instructions for causing the machine to perform any one or more of the methodologies discussed herein. In alternative embodiments, the machine operates as a standalone device or may be connected (for example, networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 700 includes a processor 702 (for example, a central processing unit (CPU), a graphics processing unit (GPU), or both), a main memory 704 (for example, random access memory), and static memory 706 (for example, static random-access memory), which communicate with each other via bus 708. The processing system 700 may further include video display unit 710 (for example, a plasma display, a liquid crystal display (LCD), or a cathode ray tube (CRT)). The processing system 700 also includes an alphanumeric input device 712 (for example, a keyboard), a user interface (UI) navigation device 714 (for example, a mouse), a disk drive unit 716, a signal generation device 718 (for example, a speaker), and a network interface device 720.

The disk drive unit 716 (a type of non-volatile memory storage) includes a machine-readable medium 722 on which is stored one or more sets of data structures and instructions 724 (for example, software) embodying or utilized by any one or more of the methodologies or functions described herein. The data structures and instructions 724 may also reside, completely or at least partially, within the main memory 704, the static memory 706, and/or within the processor 702 during execution thereof by processing system 700, with the main memory 704 and processor 702 also constituting machine-readable, tangible media.

The data structures and instructions 724 may further be transmitted or received over a computer network 726 via network interface device 720 utilizing any one of a number of well-known transfer protocols (for example, HyperText Transfer Protocol (HTTP)).

Certain embodiments are described herein as including logic or a number of components, modules, or mechanisms. Modules may constitute either software modules (for example, code embodied on a machine-readable medium or in a transmission signal) or hardware modules. A hardware module is a tangible unit capable of performing certain operations and may be configured or arranged in a certain manner. In example embodiments, one or more computer systems (for example, the processing system 700) or one or more hardware modules of a computer system (for example, a processor 702 or a group of processors) may be configured by software (for example, an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (for example, hardwired) or temporarily configured (for example, programmed) to operate in a certain manner and/or to perform certain operations described herein. Considering embodiments in which hardware modules are temporarily configured (for example, programmed), each of the hardware modules need not be configured or instantiated at any one instance in time. For example, where the hardware modules include a general-purpose processor 702 that is configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications May be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time; access the memory device to retrieve and process the stored output. Modules may also initiate communications with input or output devices, and can operate on a resource (for example, a collection of information).

The various operations of example methods described herein may be performed, at least partially, by one or more processors 702 that are temporarily configured (for example, by software) or permanently configured to perform the relevant operations. Whether temporarily or permanently configured, such processors 702 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine but deployed across a number of machines. In some example embodiments, the processors 702 may be located in a single location (for example, within a home environment, within an office environment, or as a server farm), while in other embodiments, the processors 702 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method comprising:
  monitoring an application implemented using one or more processors;
  identifying activity data associated with operation of the application;
  storing the activity data in a cyclic buffer;
  detecting, using one or more processors, an error event associated with the operation of the application; and in response to detecting the error event associated with the operation of the application, writing the activity data stored in the cyclic buffer to a log file, and clearing the cyclic buffer.

2. The method of claim 1, the cyclic buffer having a fixed size.

3. The method of claim 1, the cyclic buffer being stored in a volatile memory device.

4. The method of claim 1, the storing of the activity data in the cyclic buffer including overwriting oldest data in the cyclic buffer.

5. The method of claim 1, the storing of the activity data in the cyclic buffer including updating a pointer associated with the cyclic buffer, the pointer indicating oldest data in the cyclic buffer.

6. The method of claim 1, the activity data being associated with the operation of the application including an operating status of the application.

7. The method of claim 1, the activity data being associated with the operation of the application including a user input to the application.

8. The method of claim 1, further comprising determining the cyclic buffer size based on activity data associated with the application.

9. The method of claim 1, further comprising generating an alert identifying an error responsive to detecting the error event associated with the operation of the application.

10. The method of claim 1, the log file being maintained in a persistent storage device.

11. A system comprising:
at least one processor; and
modules comprising instructions that are executable by the at least one processor, the modules comprising:
an application monitoring module configured to monitor an application implemented using the at least one processor, the application monitoring module further configured to identify activity data associated with operation of the application;
a buffer management module configured to store the activity data in a cyclic buffer, the buffer management module further configured to clear the cyclic buffer responsive to detection of an error event associated with the operation of the application;
an event analysis module configured to detect the error event associated with the operation of the application; and
a log file manager configured to write the activity data in the cyclic buffer to a log file responsive to the event analysis module detecting the error event associated with the operation of the application.

12. The system of claim 11, the buffer management module further configured to overwrite oldest data in the cyclic buffer when storing the activity data in the cyclic buffer.

13. The system of claim 12, the buffer management module further configured to update a pointer associated with the cyclic, buffer, the pointer indicating oldest data in the cyclic buffer.

14. The system of claim 11, further comprising an error handling module configured to generate an alert identifying an error responsive to the event analysis module detecting an error event associated with the operation of the application.

15. A non-transitory computer-readable storage medium comprising instructions that, when executed by at least one processor of a machine, cause the machine to perform operations comprising:
monitoring an application implemented using one or more processors;
identifying activity data associated with operation of the application;
storing the activity data in a cyclic buffer;
detecting an error event associated with the operation of the application; and
in response to detecting the error event associated with the operation of the application, writing the activity data stored in the cyclic buffer to a log file, and clearing the cyclic buffer.

16. The non-transitory computer-readable storage medium of claim 15, further comprising instructions that cause the machine to perform operations comprising updating a pointer associated with the cyclic buffer, the pointer indicating oldest data in the cyclic buffer.

17. The non-transitory computer-readable storage medium of claim 15, the cyclic buffer having a fixed size.

18. The non-transitory computer-readable storage medium of claim 15, further comprising instructions that cause the machine to perform operations comprising determining the cyclic buffer size based on activity data associated with the application.

19. The non-transitory computer-readable storage medium of claim 15, further comprising instructions that cause the machine to perform operations comprising generating an alert identifying an error responsive to detecting the error event associated with the operation of the application.

20. The non-transitory computer-readable storage medium of claim 15, the log file being maintained in a persistent storage device.

\* \* \* \* \*